United States Patent [19]

Boucher et al.

[11] Patent Number: 5,390,152
[45] Date of Patent: Feb. 14, 1995

[54] FORWARD LOOKING ECHOSOUNDER

[75] Inventors: Stephen G. Boucher, Amherst; Michael J. Simoneau, Merrimack, both of N.H.

[73] Assignee: Airmar Technology Corporation, Milford, N.H.

[21] Appl. No.: 154,746

[22] Filed: Nov. 18, 1993

Related U.S. Application Data

[63] Continuation-in-part of Ser. No. 118,893, Sep. 9, 1993, abandoned.

[51] Int. Cl.⁶ .............................................. G01S 15/89
[52] U.S. Cl. ....................................... 367/12; 367/88
[58] Field of Search ............................. 367/12, 88, 111

[56] References Cited

U.S. PATENT DOCUMENTS

| | | | |
|---|---|---|---|
| 3,641,484 | 2/1972 | White et al. | 367/88 |
| 4,057,779 | 11/1977 | Iida et al. | 367/103 |
| 4,232,380 | 11/1980 | Caron et al. | 367/88 |
| 4,445,186 | 4/1984 | Caron et al. | 364/521 |
| 4,642,801 | 2/1987 | Perny | 367/88 |
| 4,935,906 | 6/1990 | Baker et al. | 367/111 |
| 4,970,700 | 11/1990 | Gilmour et al. | 367/88 |

FOREIGN PATENT DOCUMENTS

93/03334  2/1993  WIPO.

OTHER PUBLICATIONS

Eagle Electronics, Z—7500 Operation Manual, 1987, pp. 23-24.

Primary Examiner—Daniel T. Pihulic
Attorney, Agent, or Firm—Hamilton, Brook, Smith & Reynolds

[57] ABSTRACT

A forward looking echosounder uses a non-scanning forward looking transducer inclined from the horizontal at a 45° angle. The forward looking transducer produces a set of acoustic data signals indicative of echo signals received along the central axis of the sonic beam as produced by the transducer. Distance and depth coordinates are used in conjunction with vessel speed and pitch angle to determine where the source of the received echo is located relative to the moving vessel. This information is then displayed in a quasi-real time display format.

37 Claims, 6 Drawing Sheets

FORWARD LOOKING ECHOSOUNDER

RELATED APPLICATION

This application is a Continuation-In-Part of U.S. patent application Ser. No. 08/118,893, entitled "Forward Looking Echo Sounder" filed Sep. 9, 1993, now abandoned.

BACKGROUND OF THE INVENTION

Conventional echosounders with forward looking capability generally employ a mechanically driven scanning transducer. The scanning transducer is rotated by a stepping motor in response to signals from a controller. (See, e.g., U.S. Pat. No. 4,935,906). The requirement for rotating the transducer in the forward direction introduces cost and complexity to the system.

A need exists therefore for a low cost alternative forward looking echosounder system.

SUMMARY OF THE INVENTION

An echosounder is provided in accordance with the invention which comprises a non-scanning forward looking transducer inclined from the horizontal at a preferred angle of 45°. The forward looking transducer produces a set of acoustic data signals indicative of echo signals received along the central axis of the sonic beam as produced by the transducer. This data is digitized and converted, or resolved, into x (forward distance from the vessel) and y (depth) components or coordinates.

These x and y coordinates are used in conjunction with vessel speed obtained from a speed transducer to determine where the source of the received echo is located relative to the moving vessel. This information is then displayed in a quasi-real time display format.

A preferred embodiment of the invention is a sonar system for detecting objects traversing a medium relative to a vessel. In a particular preferred embodiment of the invention, the medium is water and the vessel is a boat. The objects are typically fish targets in the water or the bottom contour.

A pair of transducers are adapted for generating respective sonar beams into the medium. A first transducer directs a beam at a first inclined angle with respect to a horizontal axis through the vessel. In particular, the first inclined angle is 45° relative to the horizontal axis and the central axis is directed forward of the vessel. A second transducer directs a beam downward at a second angle with respect to the horizontal axis. In particular, the second angle is 90°. A pair of receivers detect reflections of the beams from objects in the path of the respective beam. The receivers generate a respective set of data in response to the detection of reflections from objects.

A computer combines the sets of data from the receivers and generates a quasi-real time representation of the objects in the path between the beams over time. A display is used to display the quasi-real time representation to a user.

In another preferred embodiment of the invention, a speed sensor senses the speed of the vessel and generates a speed signal proportional to the speed of the vessel. The computer correlates the computed quasi-real time representation with vessel speed for display to the user.

The inclined angle is nominally inclined at 45°, but the angle varies over time due to pitching and trim of the vessel. The computer compensates for variations in the inclined angle. The computer also determines bottom hardness in quasi-real time.

The above and other features of the invention, including various novel details of construction and combination of parts, will now be more particularly described with reference to the accompanying drawings and pointed out in the claims. It will be understood that the particular forward looking echosounder embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
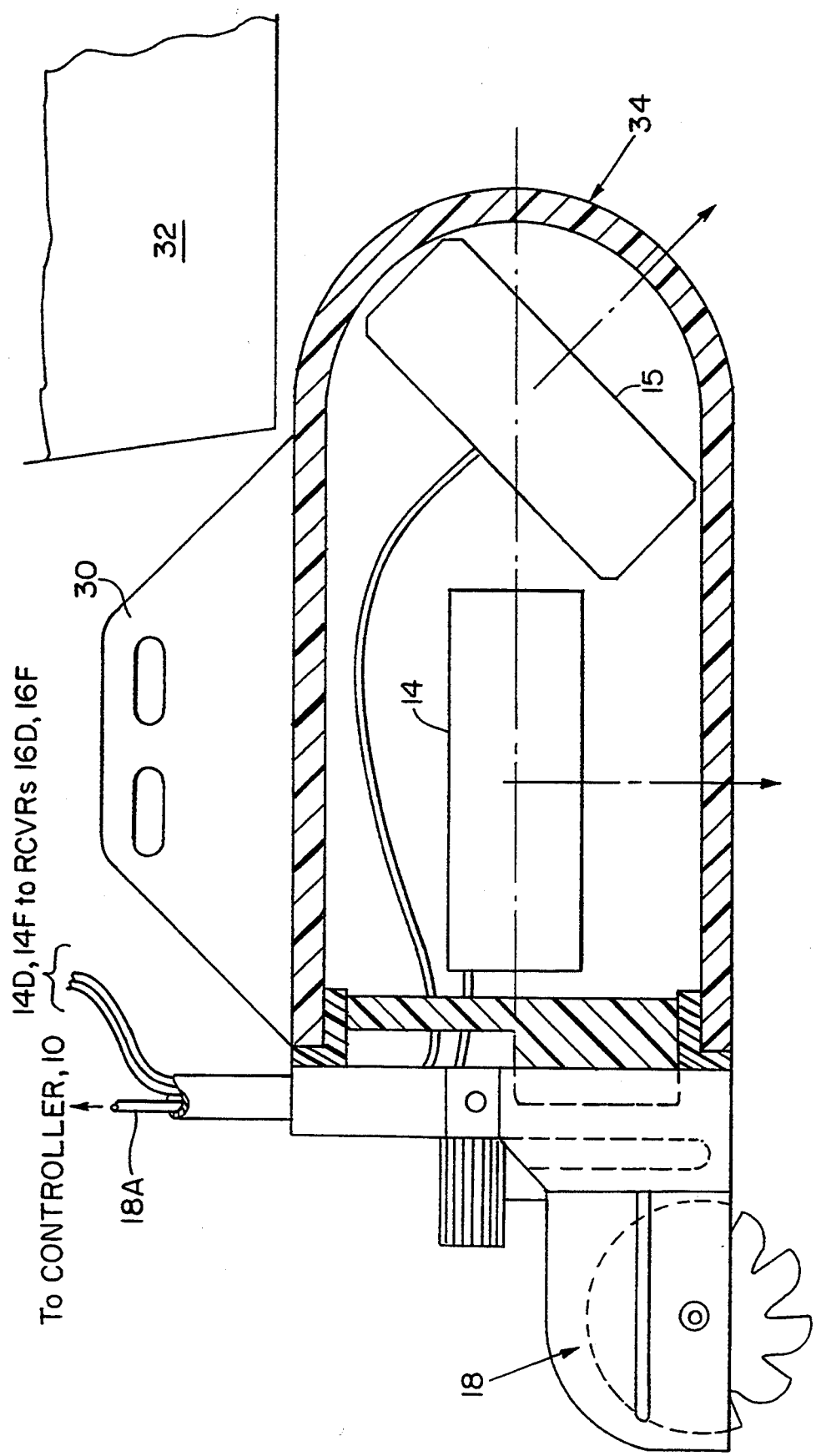
FIG. 1 is a schematic view of a forward looking source transducer sensor system 10 of the invention.
Figure 2:
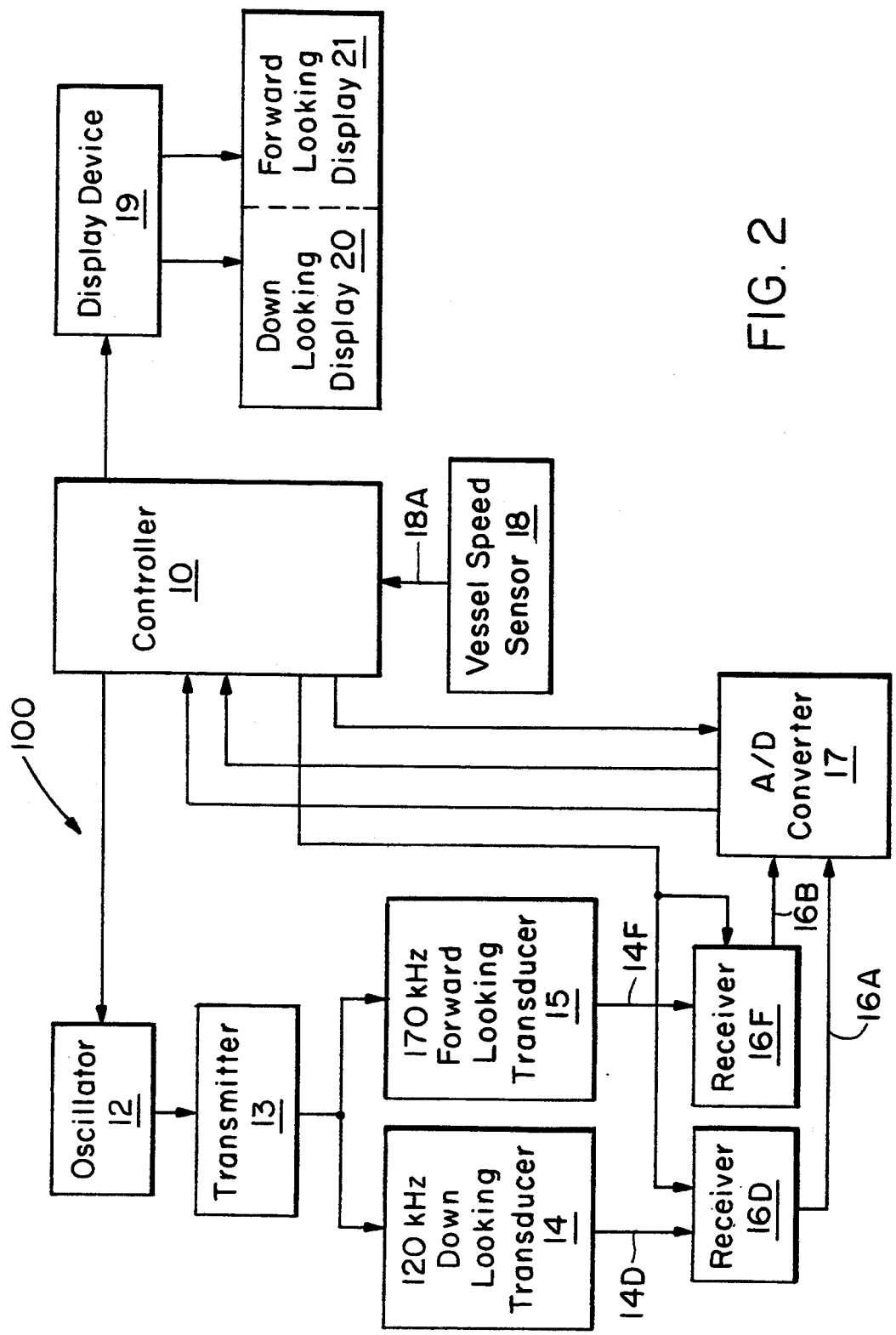
FIG. 2 is a block diagram of the display electronics associated with the sensor system 10.

Referring now to FIGS. 1 and 2, a preferred embodiment of the invention will now be described in detail. The system 100 of the invention is comprised of the following main elements:

A controller 10 controls all aspects of the system operation including the pulse width, frequency and repetition rate of an oscillator 12. The oscillator 12 produces a pulse containing electrical energy at a frequency matched to the best operating frequency of the respective transducer. A transmitter 13 amplifies the pulse from the oscillator 12 to levels suitable for echo detection.

The controller 10 selects which transducer 14, 15 is pulsed and may adjust the gain of receivers 16D,16F. A Down Looking Transducer 14 converts electrical energy to acoustical energy and vice versa. The output of the Down Looking Transducer 14 is an echogram, i.e. an electrical representation of the reflective targets encountered by the acoustical pulse transmitted. A Forward Looking Transducer 15 operates the same as the Down Looking Transducer 14 except the angle of orientation for the Forward Looking Transducer 15 is 45° (in a preferred case) from the horizontal, causing the Forward Looking Transducer 15 to detect objects located ahead of the vessel. The receivers 16D,16F respectively condition and amplify the echogram from the Down Looking Transducer 14 and Forward Looking Transducer 15.

The controller 10 controls a trigger and sampling rate A/D converter 17 and also calculates vessel speed with input from a sensor 18. The A/D converter 17 converts the analog echo data to digital format. A Vessel Speed Sensor 18 is preferably of the type described in U.S. Pat. No. 4,555,938, which produces a series of pulses, the frequency of which is proportional to vessel speed. The sensor 18 and transducer assembly 34 are mounted on hull 32 by a bracket 30 of the type shown in U.S. Pat. No. 4,850,559. (See FIG. 1). The controller 10 translates echo profiles from the A/D converter 17 into display data and stores previous echo profiles and calculates quasi-real time display data based on vessel speed and historical echo profiles.

A display device 19 converts data from the controller 10 into signals suitable for display on LCD or CRT screen displays 20,21.

A Down Looking Display 20 displays a visual representation of the echogram. As new echograms are recorded, previous echograms are moved from right to left, producing a historic view of echo targets detected by the transducer. The right to left motion of targets can be related to vessel speed to produce a two-dimensional historical contour of the targets.

A Forward Looking Display 21 functions in the inclined direction as the Down Looking Display 20 does in the vertical direction. When the displays 20,21 are juxtaposed, the result is a quasi-real time representation of the contour of the bottom plus the location of objects, which can be made to move across the screen in proportion to vessel speed.

Figure 3:
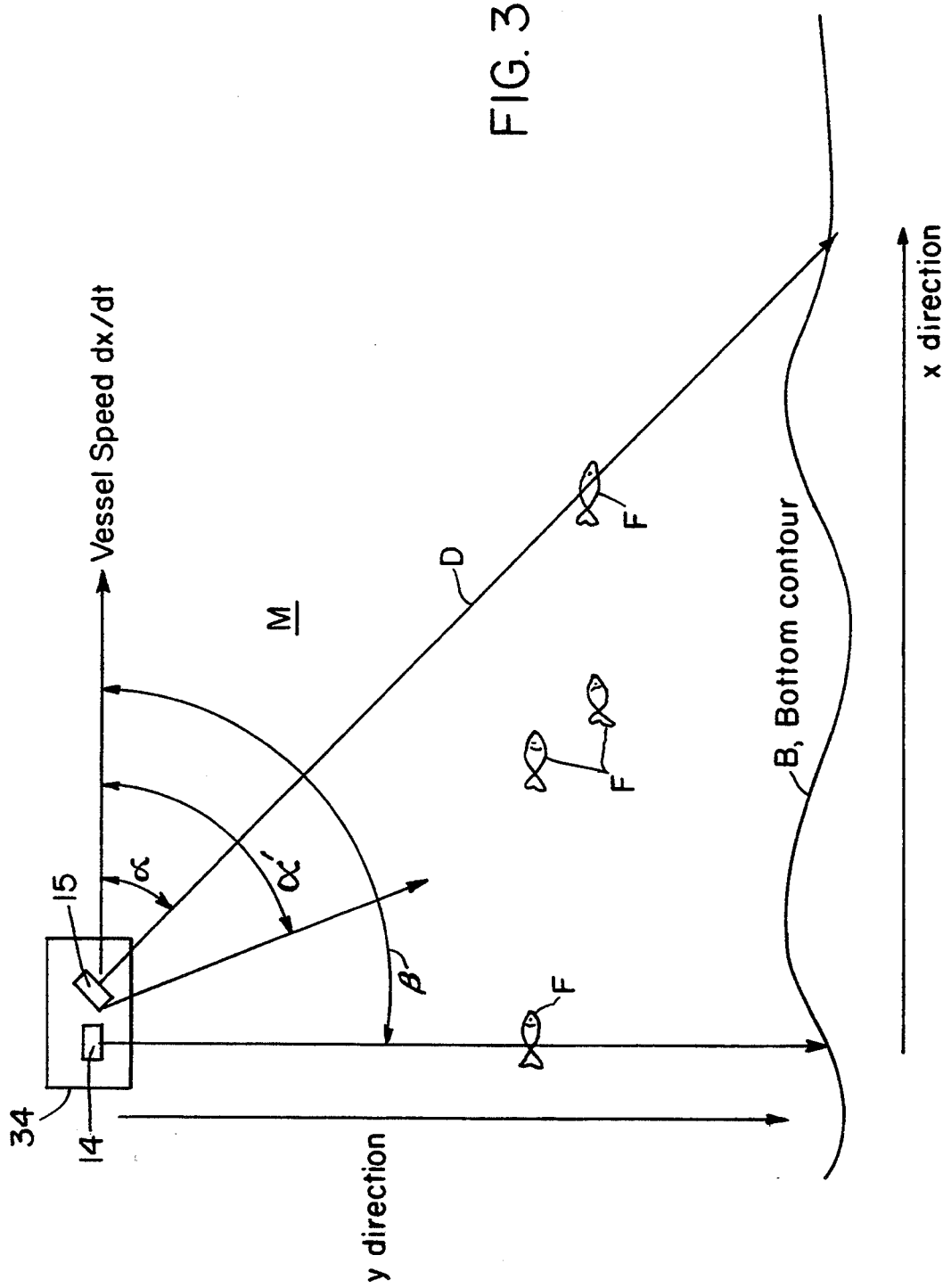
FIG. 3 is a schematic representation of the apparatus of the invention illustrating the geometry of the graphical display.

In operation, the controller 10 sends instructions sequentially to the oscillator 12 causing the oscillator 12 to output two pulses containing energy at two different frequencies. The pulses are coupled to the transmitter 13 where they are amplified and coupled to the respective transducers 14,15. Preferably, each transducer operates at only one of the two frequencies, eliminating interference between the two transducers 14,15. The transducers 14,15 convert the electrical pulse to an acoustical pulse and project the pulse into a medium 34 (See FIG. 3). The pulses then travel through the medium 14 reflecting from objects such as fish (F) and bottom (B), and returning to the transducers, where they are converted back into electrical energy. The receivers 16D, 16F amplify and condition the echo signals, adjusting gain based on internal time varied gain circuit instructions from the controller 10. The A/D converter 17 converts the conditioned signals into digital signals and sends them to the controller 10 for processing and/or storage.

The vessel speed sensor 18 sends a series of pulses to the controller 10. The frequency of the pulses is proportional to the vessel speed (dx/dt).

The controller 10 converts the signals received from the vessel speed sensor 18 and transducers 14,15 into a signal suitable for the display 20,21. The display driver 19 controls the operation of the LCD or CRT displays 20,21 upon which a visual representation of acoustical targets is displayed.

Preferably the transducers 14, 15 are operated at respective frequencies of 120 kHz and 170 kHz. The Forward Looking Transducer 15 preferably has a beam width ω of about 10° and is inclined at an angle α of 45°. The Forward Looking Transducer 15 generates a set of data along a 45° line starting at the transducer 15 out to the maximum slant range of the transducer 15. As the vessel moves at a predetermined rate the data in the triangle YXD is filled in.

As the vessel moves forward, data is recorded as to the location of the bottom B and fish targets F located in two axis: 1) directly beneath the vessel and 2) ahead of the vessel at an angle 45° from the horizontal. The location of objects between those two axis and behind the vertical axis is determined by relating vessel speed to a history of data taken.

If a target location has been recorded along the α direction at distance D from the vessel, then as the vessel travels forward, new target locations can be calculated if vessel speed is known. The vessel speed can be expressed in the following equation:

$$\text{Vessel speed} = \frac{dx}{dt} \tag{1}$$

The controller 10 determines the new location of a target along the α' axis based on the target's previous location at D along the α axis based on the following equations:

$$D = \sqrt{X^2 + Y^2}, \tag{2}$$

where D is the previous distance to the target along the direction of acoustic propagate.

$$X = D \cos \alpha, \tag{3}$$

where X is the previous distance to the target along the horizontal axis x.

$$Y = D \sin \alpha, \tag{4}$$

where Y is the previous distance to the target along the vertical axis y.

$$D' = \sqrt{X'^2 + Y'^2}, \tag{5}$$

where D' is the new distance to the target along the α' axis.

$$X' = D' \cos \alpha', \tag{6}$$

where X' is the new distance to the target along the horizontal axis x.

$$Y' = D' \sin \alpha', \tag{7}$$

where Y' is the new distance to the target along the vertical axis y.

$$X' = X - \left(\frac{dx}{dt}\right) * \Delta t, \tag{8}$$

where Δt is the time elapsed since the previous data was taken at angle α.

It can be assumed that $$Y' = Y, \tag{9}$$

which indicates that there is no change in target position along the vertical axis.

The display is scrolled and scaled so that the motion of targets as they scroll across the screen is proportional to vessel speed.

The display of historical data along the α axis is merged with the display of historical data along the y axis to create a continuous, quasi-real time display of bottom contour along with fish target locations.

When the sensor is correctly aimed, the center of the acoustic beam is located 45° below the horizontal axis of the vessel. Errors can result from pitching and changes in vessel attitude (or angle of attack in aerodynamic terms) due to hull shape, trim tabs, and vessel speed. During a pitching motion of a vessel, the declination angles of the transducer elements relative to horizontal change considerably. For example, looking only at the leading edge of the forward element bottom echo, there will be about a 30% apparent change in depth as the vessel pitches ±10°. Pitching is a periodic motion while the change in attitude is an aperiodic motion. If no pitch correction was applied, the depth would appear to rise and fall in a periodic fashion.

In addressing pitch correction, it is assumed that the pointing angle of the inclined acoustic beam varies by the angle $\phi$, which corresponds to the instantaneous vessel pitch angle. In the operation of an echosounder with a dot matrix or CRT (pixel) display, the error induced by pitching can be corrected in several ways.

One preferred solution is to place the data along the center of beam on the display along the line where the beam was actually aimed. This solution involves considerable processing as the vessel moves forward to fill in the echogram history in a seamless manner. In reality, however, this solution requires considerable graphics software.

A second preferred solution is to discard acoustic data taken when pitch is beyond a certain angle. This solution is not particularly realistic given the relative slow pulse repetition rate of sonar systems (due to the slow speed of sound). In a system employing this solution, the display would show blank lines, which users would find annoying and confusing.

A third preferred solution is to vary the actual axis where the sonar beam is aimed. The data taken along any instantaneous Slant Range axis can be corrected for slant range and forward depth and overlaid on the 45° nominal axis $SR_{NOM}$. This solution can be implemented in either of two ways:

i) The bottom echo only can be corrected for slant range and "forward depth"; or
ii) All echoes can be corrected.

Figure 4:
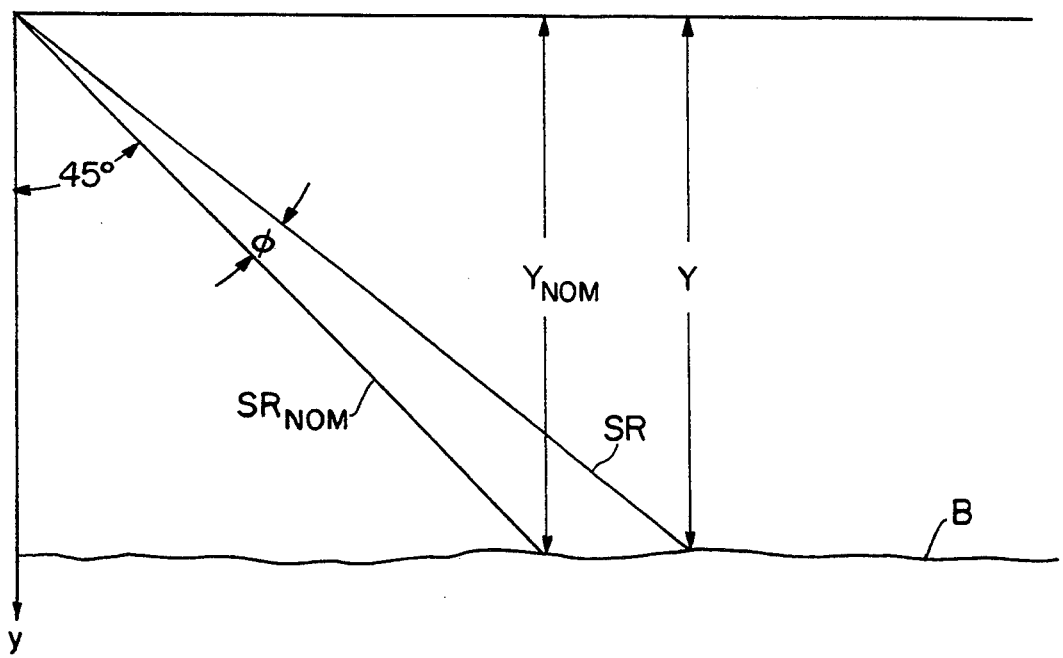
FIG. 4 is a diagrammatic representation of the apparatus of the invention illustrating the effect of pitching motion on slant range.

FIG. 4 is a diagrammatic representation of the apparatus of the invention illustrating the effect of pitching motion on slant range. The depth Y at an angle θ relative to the vertical axis is given by the equation:

$$Y = SR \cos \theta \qquad (10)$$

where SR is the instantaneous slant range measured at the centroid of energy of the pulse envelope. At a 45° angle, which is the nominal axis, the nominal depth can be computed from Equation 10 as:

$$Y_{NOM} = SR_{NOM} \cos 45° = (0.707) SR_{NOM} \qquad (11)$$

When the vessel pitches by the angle $\phi$, the correct depth, Y, is computed as:

$$Y = SR\cos(45° + \phi) \qquad (12)$$

Because the data obtained when the boat is pitching is used in the computation, it can be assumed that the bottom is flat in the local area within the area ensonified by the pitching vessel and, therefore, $Y = Y_{NOM}$. All data taken along the inclined slant range line also can be corrected and then used as 45° axis data, $SR_{NOM}$. If $Y = Y_{NOM}$, then:

$$SR_{NOM} \cos 45° = SR\cos(45° + \phi), \qquad (13)$$

which reduces to:

$$SR_{NOM} = \frac{SR\cos(45° + \phi)}{\cos 45°} \qquad (14)$$
$$= (1.41) SR_{NOM}\cos(45° + \phi).$$

The above technique does result in smearing of data because data is being angularly translated from the instantaneous axis to the 45° axis. This translation causes fish targets F to appear larger and bottom contours to be averaged or smoothed. Although the above technique does degrade the display, it is simple to implement and much better than no pitch correction at all.

Figure 5A:
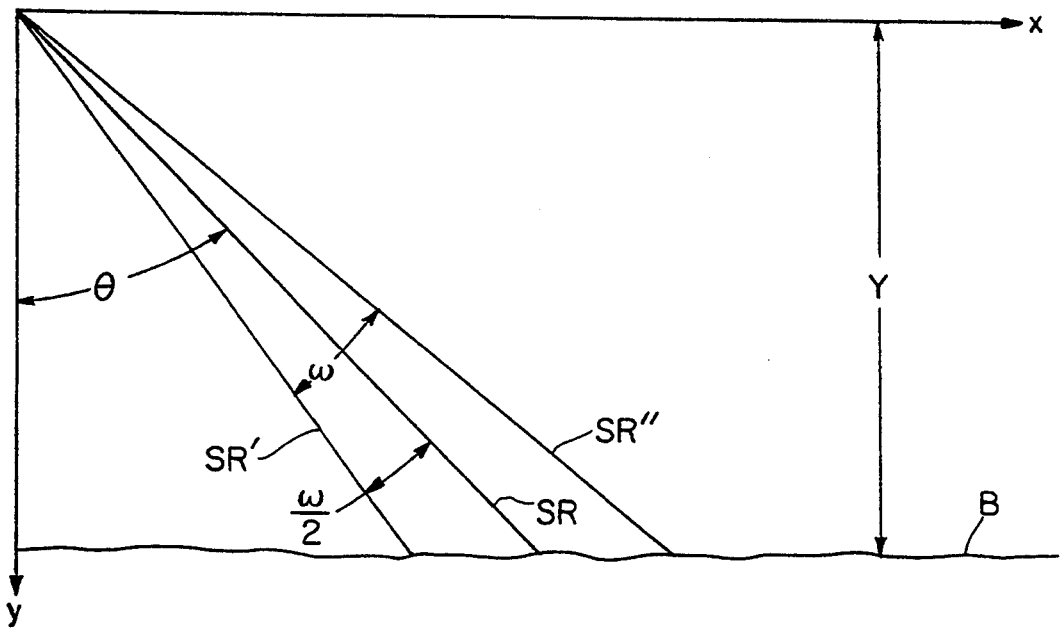
FIG. 5A is a diagrammatic representation of the geometry associated with a sonar beam.

A more effective method of correlating with pitching motion is to measure echo length. FIG. 5A is a diagrammatic representation of a sonar beam through the medium N. The sonar beam is inclined at angle $\phi$ with respect to the vertical axis y and has a beam width $\omega$. The slant range at the center of the beam is indicated as SR. The near edge of the return beam indicates a slant range SR' while the far edge of the beam indicates a slant range SR". The vertical distance to the central axis of the beam Y is provided by equation 10. The near and far beam edges are separated by the pulse width $\omega$, with the central axis of the beam bisecting the pulse width $\omega$. Consequently, the depth Y can be computed from the beam edge returns as follows:

$$Y = SR'\cos\left(\theta - \frac{\omega}{2}\right) \qquad (15)$$

$$Y = SR''\cos\left(\theta + \frac{\omega}{2}\right) \qquad (16)$$

Figure 5B:
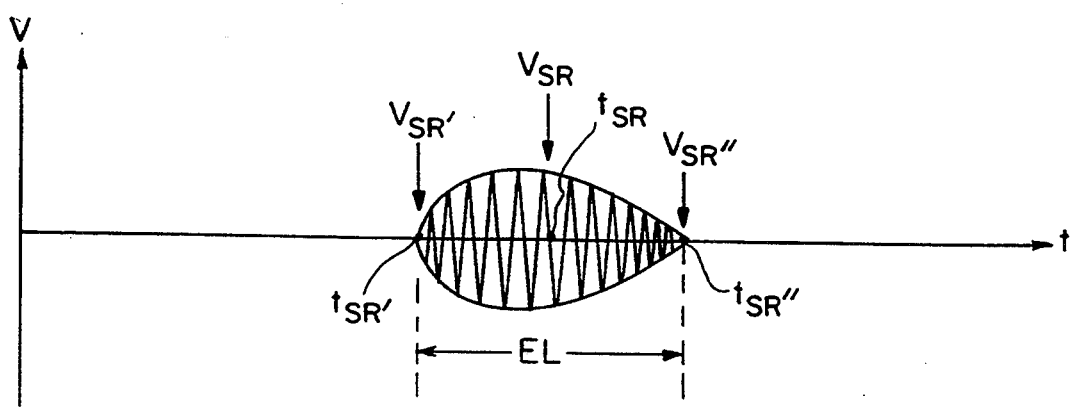
FIG. 5B is an echogram corresponding to the sonar returns of FIG. 5A.

FIG. 5B is an echogram corresponding to the sonar beam of. FIG. 5A. The echogram is the voltage output V of the Forward Looking Transducer 15 vs. time t. The time t is converted to slant range such that the voltage $V_{SR}$ at time $t_{SR}$ corresponds to the return signal intensity at the slant range SR. Similar calculations are done for the near slant range SR' and the far slant range SR". The echo length EL can be calculated using the following equation:

$$EL = SR''\sin\left(\theta + \frac{\omega}{2}\right) - SR'\sin\left(\theta - \frac{\omega}{2}\right) \qquad (17)$$

Figure 6A:
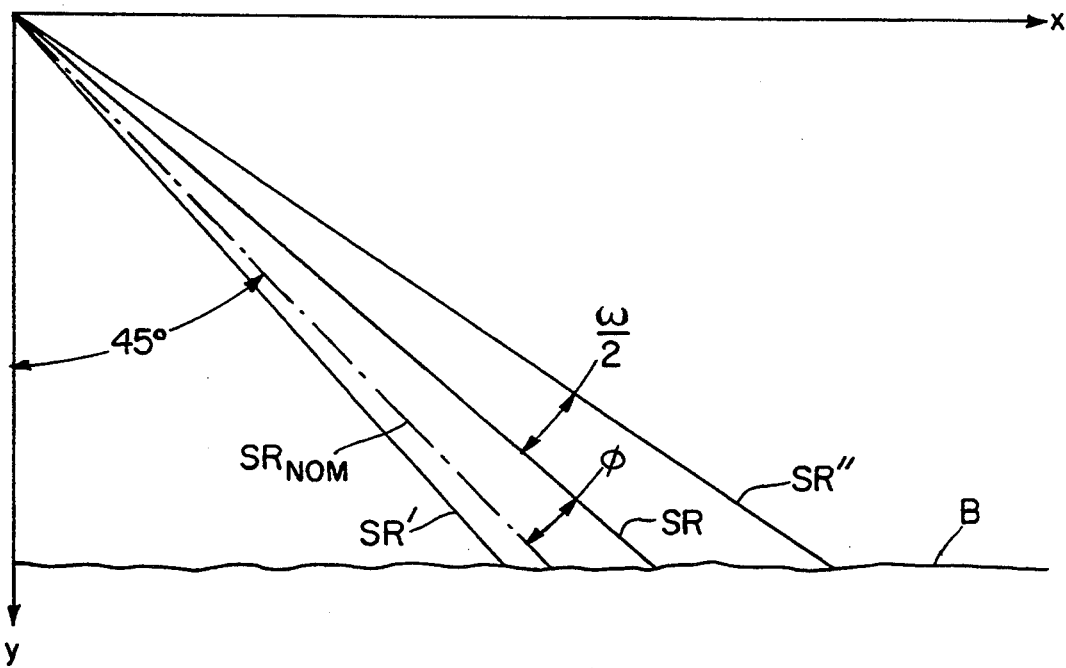
FIG. 6A is a diagrammatic representation of the geometry associated with a sonar beam during pitching motion.

In a preferred embodiment, the center of the sonar beam is directed along an inclined axis of 45°. However, pitching of the vessel creates a differential angle between the nominal 45° axis and the actual central axis. FIG. 6A is a diagrammatic representation of the sonar beam during pitching. There is a nominal slant range $SR_{NOM}$ along the 45° axis. The pulse, due to the pitching motion, however, differs from the nominal axis by an angle $\phi$. Typically, the beam width $\omega$ will not change during the pitching motion.

Figure 6B:
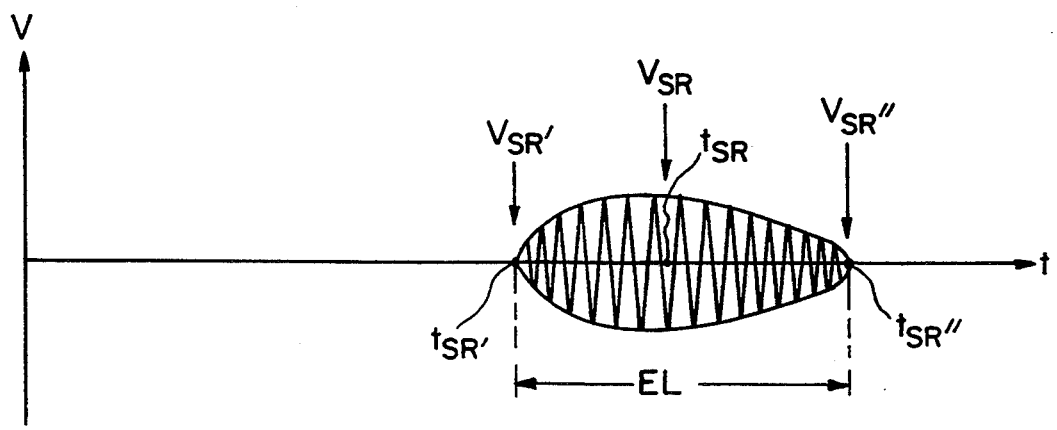
FIG. 6B is an echogram corresponding to the sonar returns of FIG. 6A.

FIG. 6B illustrates an echogram corresponding to the sonar beam of FIG. 6A. The echo length can be computed using the following equation:

$$EL = SR''\sin\left(\theta + \frac{\omega}{2} + \phi\right) - SR'\sin\left(\theta - \frac{\omega}{2} + \phi\right) \quad (18)$$

where the angle $\theta$ is typically 45°.

Substituting, and solving for the nominal slant range $SR_{NOM}$, the following equation is obtained:

$$SR_{NOM} = \frac{SR'\sin\left(45° - \frac{\omega}{2} + \phi\right)}{\cos 45°} \quad (19)$$

When the echo length EL is known as well as $\theta$, SR' and SR'', equation 18 can be solved for $\phi$. Knowing the pitch angle $\phi$, the slant range along the central axis $SR_{NOM}$ can be calculated using equation 19. Note that the near slant range SR' is used in equation 20. This is because it has a higher intensity value than the far slant range SR''. That is because the nearer slant range SR' is closer and usually has greater reflectivity from the bottom B.

Figure 7:
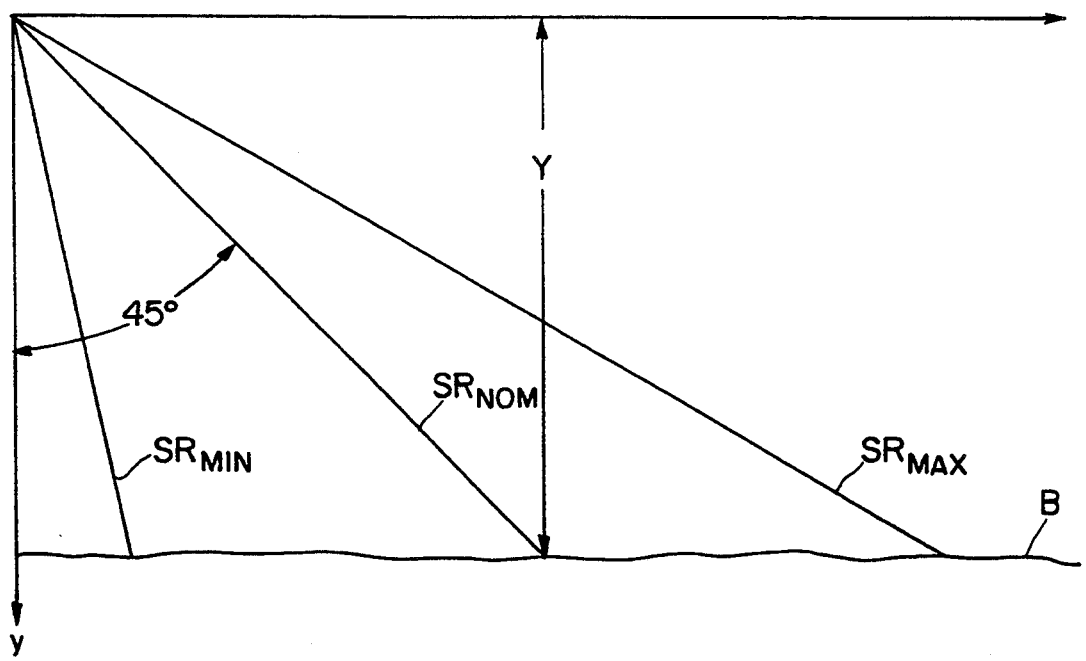
FIG. 7 is a diagrammatic representation of a sonar beam coverage during pitching motion.

FIG. 7 is a diagrammatic representation of a sonar beam coverage during a pitching motion. During one oscillation period of the pitching motion, the sonar returns indicate a minimum slant range $SR_{MIN}$ associated with the near beam edge and a maximum slant range $SR_{MAX}$ associated with the far beam edge. It can be shown that the following equality holds for the pitch oscillation:

$$\frac{\cos\left(45° - \frac{\omega}{2} - \phi\right)}{\cos\left(45° + \frac{\omega}{2} + \phi\right)} = \frac{SR_{MAX}}{SR_{MIN}} \quad (20)$$

If the beam width $\omega$ is known and is constant, then equation 20 can be solved for the pitch angle $\phi$.

Equation 18 and 20 can be solved simultaneously for both $\omega$ and $\phi$. Using that information, changes in $\omega$ for various bottom conditions (i.e., reflectivities) and angles of incidence can be computed. Because hard bottom has higher reflectivity than soft bottom, the echo length would be larger for hard bottom because the apparent beamwidth of the transducer increases when aimed at higher reflectivity targets.

The above equations assume a pulse length of one cycle, but the affect of longer pulse lengths could be added easily for completeness by one skilled in the art. This affects echo length equations and solutions for pitch angle and beam width. To make corrections for pitch angle and beam width, bottom contour is assumed to change slowly. The rate of change can be estimated by comparing the depth Y as measured along the nominal 45° axis with the depth as measured along the vertical axis, which changes only slightly if at all with pitch angle. Rapid changes in contour or bottom reflectivity causes errors in the calculation of pitch, and therefore, errors in the corrections for the displayed data.

In addition, a software-based pitch correction having a menu for pitch correction and calibration could be used with preferred embodiments of the invention. In a preferred embodiment, pitch correction can be turned on or off. A sub-menu provides selections as to sea conditions (e.g., Light Chop, Heavy Chop, Swells) and Boat Size. Larger boats have a longer pitch period than small boats, for example. The computer corrects for pitch period and these other inputs are used to adjust damping coefficients. Similarly, angle of attack while planing can be corrected via a manual input table of speed vs. angle of attack.

Equivalents

Those skilled in the art will recognize, or be able to ascertain using no more than routine experimentation, many equivalents to specific embodiments of the invention described specifically herein. Such equivalents are intended to be encompassed in the scope of the following claims. It should be noted that while the downward looking transducer is preferred to avoid distortion of returns from the forward looking transducer at long ranges it is not mandatory.

What is claimed is:

1. A sonar system for detecting objects traversing a medium relative to a vessel comprising:
    a first transducer for generating a first sonar beam into the medium having a first central axis at a first inclined angle $\alpha$ with respect to a horizontal axis through the vessel;
    a second transducer for generating a second sonar beam into the medium having a second central axis directed downward at a second angle $\beta$ with respect to the horizontal axis;
    a mount coupling the first and second transducers to the vessel and aligning the first and second central axes in a common plane;
    a first receiver for detecting reflections of the first beam from objects in the path of the first beam and generating a first set of data;
    a second receiver for detecting reflections of the second beam from objects in the path of the second beam and generating a second set of data;
    a computer for combining the first and second set of data to generate a quasi-real time representation of the objects in the path between the first and second beam over time; and
    a display for displaying the quasi-real time representation to a user.

2. The system of claim 1 wherein the medium is water and the first angle $\alpha$ is nominally 45° and the second angle $\beta$ is about 90°.

3. The system of claim 1 wherein the first angle $\alpha$ varies over time about the first central axis and the computer compensates for the variation.

4. The system of claim 3 wherein the first angle $\alpha$ varies periodically due to pitching of the vessel.

5. The system of claim 3 wherein the first angle $\alpha$ varies aperiodically due to trim of the vessel.

6. The system of claim 1 further comprising a speed sensor for sensing the speed of the vessel relative to the medium and generating a speed signal proportional to the speed of the vessel.

7. The system of the claim 6 wherein the computer correlates the quasi-real time representation with vessel speed.

8. The system of claim 1 wherein the computer determines bottom hardness in quasi-real time.

9. The system of claim 1 wherein the first transducer is directed forward of the vessel.

10. A sonar system for detecting objects traversing a medium in front of a vessel comprising:
- a first transducer for generating a first sonar beam into the medium having a first central axis directed forward of the vessel at a first inclined angle $\alpha$ with respect to a horizontal axis through the vessel;
- a second transducer for generating a second sonar beam into the medium having a second central axis directed downward at a second angle $\beta$ with respect to the horizontal axis;
- a mount coupling the first and second transducers to the vessel and aligning the first and second central axes in a common plane;
- a speed sensor for sensing the speed of the vessel and generating a speed signal proportional to the speed of the vessel;
- a first receiver for detecting reflections of the first beam from objects in the path of the first beam and generating a first set of data;
- a second receiver for detecting reflections of the second beam from objects in the path of the second beam and generating a second set of data;
- a computer for combining the first and second set of data to generate a quasi-real time representation of the objects in the path between the first and second beam over time; and
- a display for displaying the quasi-real time representation to a user.

11. The system of claim 10 wherein the medium is water and the first angle $\alpha$ is nominally 45° and the second angle $\beta$ is about 90°.

12. The system of claim 10 wherein the first angle $\alpha$ varies over time about the first central axis and the computer compensates for the variation.

13. The system of claim 12 wherein the first angle $\alpha$ varies periodically due to pitching of the vessel.

14. The system of claim 12 wherein the first angle $\alpha$ varies aperiodically due to trim of the vessel.

15. The system of claim 10 wherein the computer correlates the quasi-real time representation with vessel speed.

16. The system of claim 10 wherein the computer determines bottom hardness and quasi-real time.

17. A method for detecting objects traversing a medium relative to a vessel comprising the steps of:
- generating a first sonar beam into the medium having a first central axis at a first inclined angle $\alpha$ with respect to a horizontal axis through the vessel;
- generating a second sonar beam into the medium having a second central axis directed downward at a second angle $\beta$ with respect to the horizontal axis;
- aligning the first and second central axis to be in a common plane;
- detecting reflections of the first beam from objects in the path of the first beam;
- generating a first set of data from the detected reflections of the first beam;
- detecting reflections of the second beam from objects in the path of the second beam;
- generating a second set of data from the detected reflections of the second beam;
- generating a quasi-real time representation of the objects in the path between the first and second beam over time by combining the first and second set of data; and
- displaying the quasi-real time representation to a user.

18. The method of claim 17 wherein the step of generating a quasi-real time representation comprises compensating for variations of the first angle $\alpha$ over time.

19. The method of claim 17 further comprising, before the step of generating a quasi-real time representation, the steps of:
- sensing the speed of the vessel relative to the medium; and
- generating a speed signal proportional to the speed of the vessel.

20. The method of claim 19 wherein the step generating a quasi-real time representation comprises correlating the quasi-real time representation with vessel speed.

21. The method of claim 17 further comprising the step of determining bottom hardness in quasi-real time.

22. A sonar apparatus for detecting objects traversing a medium relative to a vessel comprising:
- a transducer for generating a sonar beam into the medium at an arbitrary time, the sonar beam having a central axis at an inclined angle $\alpha$ with respect to a horizontal axis through the vessel, wherein the inclined angle $\alpha$ varies over time due to motion of the vessel relative to the medium;
- a receiver for detecting reflections of the sonar beam from objects in the path of the sonar beam and generating a set of data from the detected reflections; and
- a computer for processing the set of data and compensating for the variation in the inclined angle $\alpha$.

23. The apparatus of claim 22 wherein the medium is water and the inclined angle $\alpha$ is nominally 45°.

24. The apparatus of claim 22 wherein the variation in the inclined angle $\alpha$ varies periodically due to pitching of the vessel.

25. The apparatus of claim 22 wherein the inclined angle $\alpha$ varies aperiodically due to trim of the vessel.

26. The apparatus of claim 22 wherein the computer determines bottom hardness in quasi-real time.

27. The apparatus of claim 22 wherein the set of data includes an echo length and the computer compensates for the variation in the inclined angle $\alpha$ in response to the echo length.

28. The apparatus of claim 22 wherein the computer adapts to motion conditions of the medium.

29. The apparatus of claim 28 wherein motion conditions of the medium are categorized by a user.

30. A method for detecting objects traversing a medium relative to a vessel, comprising the steps of:
- generating a sonar beam into the medium at an arbitrary time, the sonar beam having a central axis at an inclined angle $\alpha$ with respect to a horizontal axis through the vessel, wherein the inclined angle $\alpha$ varies over time due to motion of the vessel relative to the medium;
- detecting reflections of the sonar beam from objects in the path of the sonar beam;
- generating a set of data from the detected reflections of the sonar beam; and
- from the set of data, compensating for the variation in the inclined angle $\alpha$ over time.

31. The method of claim 30 wherein the medium is water and the inclined angle $\alpha$ is nominally 45°.

32. The method of claim 30 wherein the inclined angle $\alpha$ varies periodically due to pitching of the vessel.

33. The method of claim 30 wherein the inclined angle α varies aperiodically due to trim of the vessel.

34. The method of claim 30 further comprising the step of determining bottom hardness in quasi-real time.

35. The method of claim 30 wherein the step of compensating comprises computing an echo length of each reflected sonar beam and computing pitch as a function of the echo length.

36. The method of claim 30 further comprising the step of adapting to motion conditions of the medium.

37. The method of claim 36 wherein the motion conditions of the medium are categorized by a user.

* * * * *